US006944243B2

(12) United States Patent
Ohtaki et al.

(10) Patent No.: US 6,944,243 B2
(45) Date of Patent: Sep. 13, 2005

(54) DIVERSITY RECEPTION DEVICE OUTPUTTING MAXIMIZED C/N RATIO OF SYNTHESIZED SIGNAL

(75) Inventors: Yukio Ohtaki, Fukushima-ken (JP); Toru Oyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/805,851

(22) Filed: Mar. 22, 2004

(65) Prior Publication Data

US 2004/0190658 A1 Sep. 30, 2004

(30) Foreign Application Priority Data

Mar. 26, 2003 (JP) ....................................... 2003-085224

(51) Int. Cl.[7] .......................... H04B 7/10; H04B 17/02; H04I 27/06

(52) U.S. Cl. ........................ 375/347; 375/344; 455/139

(58) Field of Search ................................ 375/316, 344, 375/347; 455/137–139, 130, 232, 234.1, 234, 235.1, 236, 240.1

(56) References Cited

U.S. PATENT DOCUMENTS 4,334,316 A * 6/1982 Tanaka ....................... 455/139
4,373,207 A * 2/1983 Hecken ...................... 455/139
5,513,222 A * 4/1996 Iwasaki ...................... 375/347

FOREIGN PATENT DOCUMENTS

JP 2003-318857 11/2003

OTHER PUBLICATIONS

*Digital Musen Tsushin–no Henfukucho* (*Modulation/Demodulation in Digital Wireless Communication*) written by Yoichi Saitoh, pp. 189–191, Fig. 5.19.

* cited by examiner

*Primary Examiner*—Tesfaldt Bocure
(74) *Attorney, Agent, or Firm*—Brinks Hofer Gilson & Lione

(57) ABSTRACT

A diversity reception device includes a plurality of antennas. A plurality of receiver circuits are connected to the corresponding antennas. An adder adds the received signals output from the receiver circuits. Phase shifters allow the received signals to be input into the adder in phase with each other. A level comparator unit compares the levels of the received signals output from the receiver circuits. A level variable unit is interposed between each of the receiver circuits and the adder, and is controlled by the level comparator unit. Each of the received signals other than the received signal having the maximum level is relatively attenuated by the corresponding level variable unit in accordance with the difference of the level of the received signal from the maximum level before being input into the adder.

3 Claims, 2 Drawing Sheets

DIVERSITY RECEPTION DEVICE OUTPUTTING MAXIMIZED C/N RATIO OF SYNTHESIZED SIGNAL

BACKGROUND OF THE INVENTION

1. Field of the Invention

The present invention relates to diversity reception devices suitable for use in on-vehicle receivers for orthogonal frequency division multiplex (OFDM) terrestrial digital broadcasts.

2. Description of the Related Art

FIG. 2 illustrates the configuration of a typical known diversity reception device in which the carrier-to-noise (C/N) ratio of a diversity-synthesized signal is maximized. In FIG. 2, one reception system has an antenna 21, a receiver 22 connected to the antenna 21, a variable gain amplifier 23 connected to the output terminal of the receiver 22, and a detector 24 for detecting the level of a signal received by the receiver 22 so as to control the gain of the variable gain amplifier 23. The other reception system has an antenna 25, a receiver 26 connected to the antenna 25, a variable gain amplifier 27 connected to the output terminal of the receiver 26, and a detector 28 for detecting the level of a signal received by the receiver 26 so as to control the gain of the variable gain amplifier 27.

A received signal output from one variable gain amplifier 23 and a received signal output from the other variable gain amplifier 27 are combined by an adder 30. A phase shifter 31 is disposed between the gain amplifier 27 and the adder 30. The phase difference between a received signal output from the variable gain amplifier 23 and a received signal output from the other variable gain amplifier 27 is detected by a phase detector 32, and the phase shifter 31 is controlled in accordance with the detected phase difference.

With this configuration, the gain of the variable gain amplifier 23 is set in accordance with the level detected by the detector 24. Similarly, the gain of the variable gain amplifier 27 is set in accordance with the level detected by the detector 28. The received signal output from the variable gain amplifier 27 is controlled by the phase shifter 31 so that it becomes in phase with the received signal output from the variable gain amplifier 23. Accordingly, the C/N ratio of the signal synthesized by the adder 30 is maximized (see, for example, *Digital Musen Tsushin-no Henfukucho* (Modulation/Demodulation in Digital Wireless Communication) edited by The Institute of Electronics, Information and Communication Engineers (IEICE), Feb. 10, 1996, pp. 189–191 and FIG. 5.19).

The received signal synthesized by the adder 30 is converted into a baseband signal by an OFDM demodulator (not shown).

In the diversity reception device configured as described above, since each variable gain amplifier 23 or 27 is feedforward-controlled in the corresponding reception system, a change in the gain of the variable gain amplifier 23 or 27 due to, for example, the ambient temperature or the power supply voltage, appears at the output side as it is. Accordingly, the level of each signal input into the adder 30 becomes different from the level set in proportion to the input level of the variable gain amplifier 23 or 27. As a result, the C/N ratio of the synthesized signal output from the adder 30 is not maximized.

SUMMARY OF THE INVENTION

Accordingly, it is an object of the present invention to maximize the C/N ratio of a diversity synthesized signal without being influenced by variations in ambient conditions.

In order to achieve the above object, the present invention provides a diversity reception device including: a plurality of antennas; a plurality of receiver circuits connected to the corresponding antennas; an adder for adding received signals output from the receiver circuits; phase shifters for allowing the received signals to be input into the adder in phase with each other; a level comparator unit for comparing levels of the received signals output from the receiver circuits; and a level variable unit being interposed between each of the receiver circuits and the adder and being controlled by the level comparator unit. Each of the received signals other than the received signal having the maximum level is relatively attenuated by the level variable unit in accordance with the difference of the level of the received signal from the maximum level before being input into the adder. With this configuration, the C/N ratio of the synthesized signal output from the adder can be maximized without being influenced by a change in ambient conditions, for example, the temperature or the power supply voltage.

The phase shifter may be interposed between each of the receiver circuits and the adder. With this arrangement, the signals from the receiver circuits can be precisely in phase with each other immediately before being input into the adder.

The level variable unit may be connected in series with the corresponding phase shifter. With this arrangement, the levels of the signals before being input into the adder can be precisely proportional to the level difference between the signals output from the receiver circuits.

DESCRIPTION OF THE PREFERRED EMBODIMENTS

Figure 1:
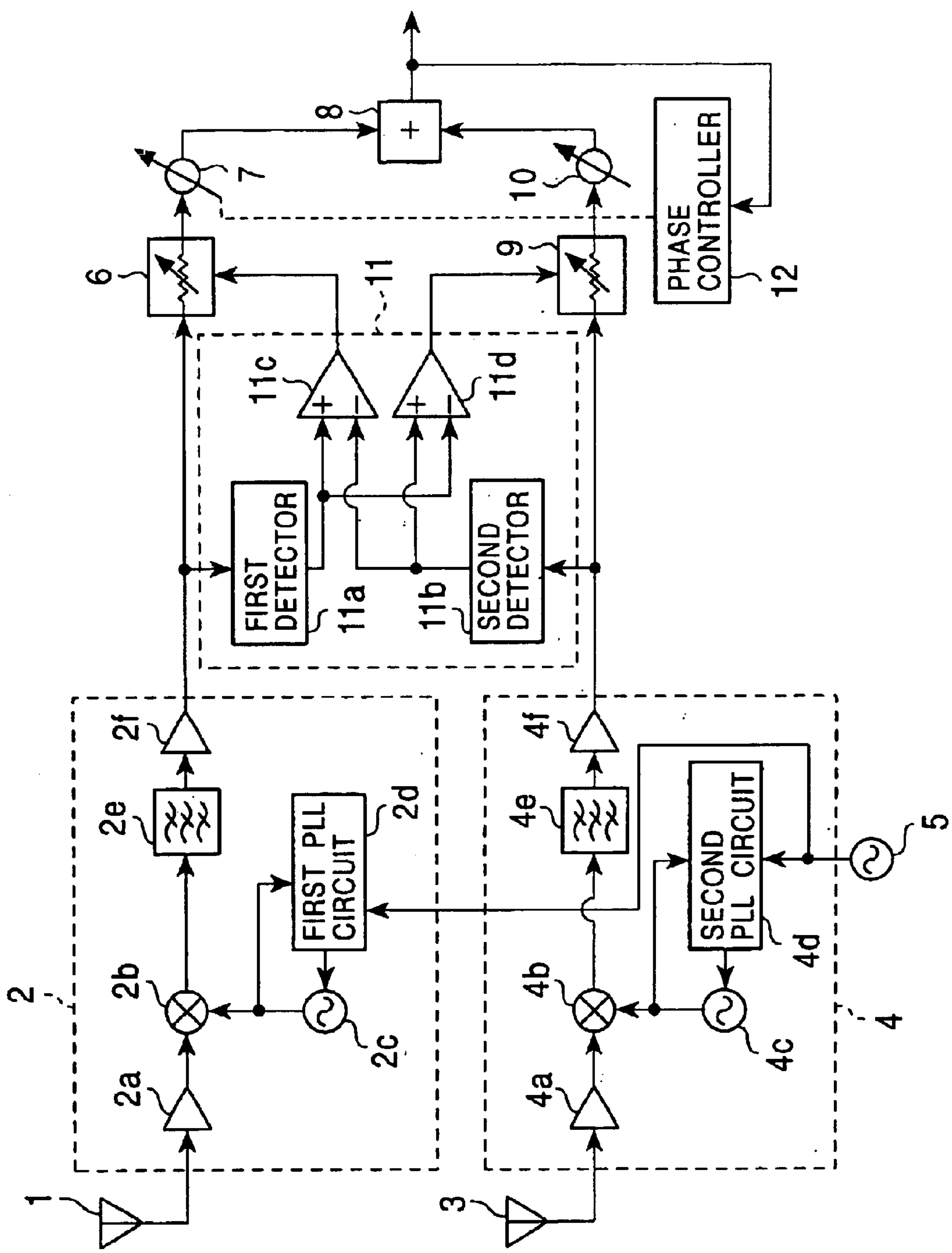
FIG. 1 is a circuit diagram illustrating the configuration of a diversity reception device according to an embodiment of the present invention.
Figure 2:
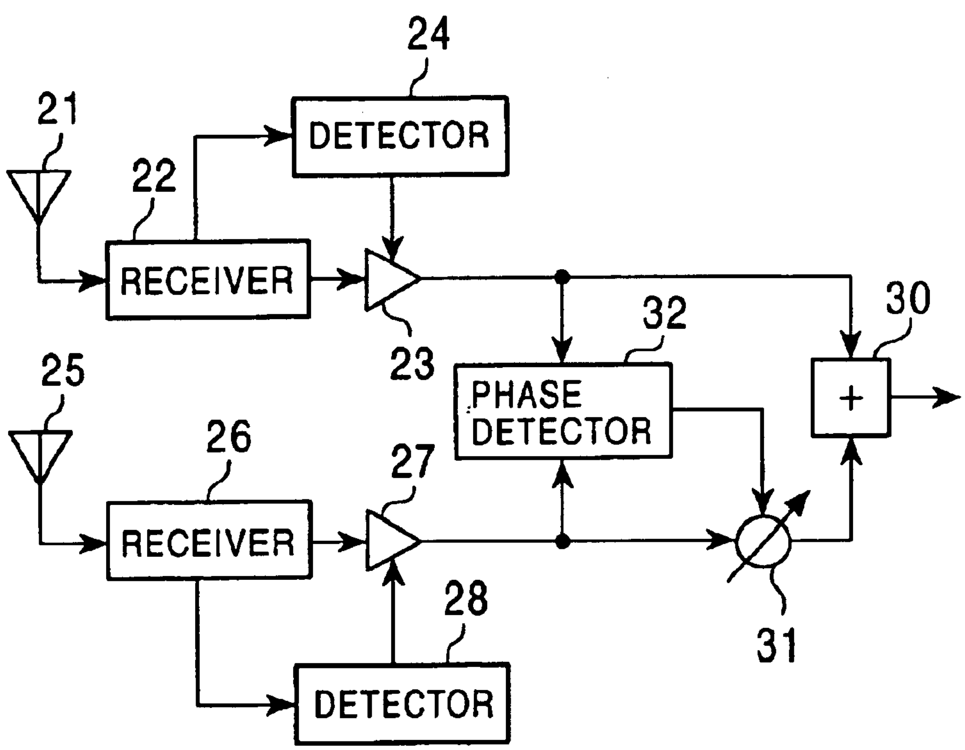
FIG. 2 is a circuit diagram illustrating the configuration of a known diversity reception device.

A diversity reception device formed of two reception systems constructed in accordance with an embodiment of the present invention is described below with reference to FIG. 1.

A first receiver circuit 2 is connected to a first antenna 1. The first receiver circuit 2 includes a first low-noise amplifier *2a* for amplifying a received signal, a first mixer **2*b* for converting the frequency of the amplified signal, a first oscillator 2*c* for supplying a local oscillation signal to the first mixer 2*b*, a first phase-locked loop (PLL) circuit 2*d* for controlling the oscillation frequency of the first oscillator 2*c*, a first intermediate frequency amplifier 2*f* for amplifying an intermediate frequency signal output from the first mixer 2*b*, and a first bandpass filter 2*e* interposed between the first mixer 2*b* and the first intermediate frequency amplifier 2*f***.

A second receiver circuit 4 is connected to a second antenna 3. The second receiver circuit 4 includes a second low-noise amplifier **4*a* for amplifying a received signal, a second mixer 4*b* for converting the frequency of the amplified signal, a second oscillator 4*c* for supplying a local oscillation signal to the second mixer 4*b*, a second phase-locked loop (PLL) circuit 4*d* for controlling the oscillation frequency of the second oscillator 4*c*, a second intermediate frequency amplifier 4*f* for amplifying an intermediate frequency signal output from the second mixer 4*b*, and a second bandpass filter 4*e* interposed between the second mixer 4*b* and the second intermediate frequency amplifier 4*f***.

A reference signal is supplied to the first and second PLL circuits **2*b* and 4*b* from a reference oscillator 5**.

A signal (intermediate frequency signal) output from the first receiver circuit 2 is input into an adder 8 via a first level-variable unit 6 and a first phase shifter 7, which are connected in series with each other. A signal output from the second receiver circuit 4 is input into the adder 8 via a second level-variable unit 9 and a second phase shifter 10, which are connected in series with each other. The first and second level-variable units 6 and 9 may be formed of variable attenuators, as shown in FIG. 1, or may be formed of variable gain amplifiers. The first or second phase shifter 7 or 10 does not have to be interposed between the adder 8 and the first or second receiver circuit 2 or 4, respectively, and may be disposed in the first or second receiver circuit 2 or 4 so that, for example, the phase of a local oscillation signal, can be shifted. In short, the first and second phase shifters 7 and 10 may be disposed anywhere as long as they can shift the received signals to be input into the adder 8 in phase with each other.

A level comparator unit 11 compares the level of the signal output from the first receiver circuit 2 with that output from the second receiver circuit 4, and also controls the first and second level-variable units 6 and 9 according to the detected level difference.

The level comparator unit 11 includes a first detector 11*a* for detecting the level of the signal output from the first receiver circuit 2, a second detector 11*b* for detecting the level of the signal output from the second receiver circuit 4, and first and second comparators 11*c* and 11*d* for comparing the two detected levels.

The detected signal output from the first detector 11*a* is input into the non-inverting input terminal (+) of the first comparator 11*c*, and the detected signal output from the second detector 11*b* is input into the inverting input terminal (−) of the first comparator 11*c*. The detected signal output from the second detector 11*b* is input into the non-inverting input terminal (+) of the second comparator 11*d*, and the detected signal output from the first detector 11*a* is input into the inverting input terminal (−) of the second comparator 11*d*.

The first and second comparators 11*c* and 11*d* output the voltage corresponding to the difference between the signal levels detected by the first and second detectors 11*a* and 11*b*. Then, the first level-variable unit 6 is controlled by the first comparator 11*c*, while the second variable unit 9 is controlled by the second comparator 11*d*.

The first and second phase shifters 7 and 10 are controlled by a phase controller 12. The phase controller 12 monitors the level of the synthesized signal output from the adder 8 so as to control one of or both the first and second phase shifters 7 and 10 so that the level of the synthesized signal is maximized. Accordingly, when the synthesized signal is maximized, the signal input from the first phase shifter 7 to the adder 8 is in phase with the signal input from the second phase shifter 10 to the adder 8. An OFDM demodulator (not shown) is provided at the stage subsequent to the adder 8 so as to demodulate the synthesized signal.

In the diversity reception device constructed as described above, when the level of the signal output from the first receiver circuit 2 is higher than that output from the second receiver circuit 4, the first comparator 11*c* controls the gain of the first level-variable unit 6 to be zero, and the second comparator 11*d* controls the second level-variable unit 9 to increase the attenuation in proportion to the level difference. In contrast, when the level of the signal output from the first receiver circuit 2 is lower than that output from the second receiver circuit 4, the operation of the first level-variable unit 6 and the operation of the second level-variable unit 9 are opposite to those described above. That is, the signal having a level lower than the other signal is attenuated by the corresponding level variable unit 6 or 9 in accordance with the level difference.

According to the above-described configuration, the first and second level-variable units 6 and 9 are controlled in accordance with the level difference between the signals output from the first and second receiver circuits 2 and 4. The gains of the received signals output from the first and second receiver circuits 2 and 4 are changed in a similar manner in spite of variations in ambient conditions, and thus, the level difference is maintained at a constant level. Therefore, the difference between the signal levels controlled by the first and second level-variable units 6 and 9 are proportional to that of the signals output from the first and second receiver circuits 2 and 4. As a result, the C/N ratio of the synthesized signal output from the adder 8 is maximized without being influenced by the ambient conditions.

The diversity reception device of the above-described embodiment has been described in the context of two systems, each including an antenna and a receiver circuit. However, the present invention is not restricted to this configuration, and may include, for example, three systems, each including an antenna and a receiver circuit. In any case, the signal having a level lower than the other signals should be attenuated in accordance with the level difference of the received signals output from the systems.

Instead of an analog circuit, the level comparator unit 11 may be formed of a digital circuit, in which case, it can digitally control the first and second level-variable units 6 and 9.

What is claimed is:

1. A diversity reception device comprising:

a plurality of antennas;

a plurality of receiver circuits connected to the corresponding antennas, the plurality of receiver circuits including first and second receiver circuits;

adder means for adding received signals output from the receiver circuits;

phase shifter means for allowing the received signals to be input into the adder means in phase with each other;

level comparator means for comparing levels of the received signals output from the receiver circuits, the level comparator means including first detector means for detecting a level of a signal output from the first receiver circuit, second detector means for detecting a level of a signal output from the second receiver circuit, and first and second comparator means for comparing the level of the signal detected by the first detector means with the level of the signal detected by the second detector means; and level variable means being interposed between each of the receiver circuits and the adder means and being controlled by the level comparator means, the level variable means interposed between the first receiver circuit and the adder means controlled by a signal output from the first comparator means, the level variable means interposed between the second receiver circuit and the adder means controlled by a signal output from the second comparator means, wherein each of the received signals other than received signal having a maximum level is relatively attenuated by the level variable means in accordance with the difference of the level of the received signal from the maximum level before being input into the adder means.

2. A diversity reception device according to claim 1, wherein the phase shifter means is interposed between each of the first and second receiver circuits and the adder means.

3. A diversity reception device according to claim 1, wherein the level variable means is connected in series with the corresponding phase shifter means.

* * * * *